US011645203B2

(12) United States Patent
Gunnels et al.

(10) Patent No.: US 11,645,203 B2
(45) Date of Patent: *May 9, 2023

(54) CACHED RESULT USE THROUGH QUANTUM GATE REWRITE

(71) Applicant: International Business Machines Corporation, Armonk, NY (US)

(72) Inventors: John A. Gunnels, Somers, NY (US); Mark Wegman, Mt. Kisco, NY (US); David Kaminsky, Chapel Hill, NC (US); Jay M. Gambetta, Yorktown Heights, NY (US); Ali Javadiabhari, Sleepy Hollow, NY (US); David C. Mckay, Ossining, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/135,647

(22) Filed: Dec. 28, 2020

(65) Prior Publication Data
US 2021/0117324 A1    Apr. 22, 2021

Related U.S. Application Data

(63) Continuation of application No. 16/201,279, filed on Nov. 27, 2018, now Pat. No. 10,901,896.

(51) Int. Cl.
*G06F 12/0802*     (2016.01)
*G06F 12/02*       (2006.01)

(52) U.S. Cl.
CPC ...... *G06F 12/0802* (2013.01); *G06F 12/0215* (2013.01); *G06F 2212/654* (2013.01)

(58) Field of Classification Search
CPC ................... G06F 12/0802; G06F 12/0215
USPC ............................................... 716/100
See application file for complete search history.

(56) References Cited

U.S. PATENT DOCUMENTS

| 9,208,280 | B2 | 12/2015 | Bocharov et al. |
| 9,514,415 | B2 | 12/2016 | Bocharov et al. |
| 9,836,698 | B2 | 12/2017 | Bocharov et al. |
| 10,901,896 | B2 * | 1/2021 | Gunnels .............. G06F 12/0802 |
| 11,169,801 | B2 * | 11/2021 | Cao ....................... G06F 9/3001 |

(Continued)

FOREIGN PATENT DOCUMENTS

WO     2017053986 A1     3/2017

OTHER PUBLICATIONS

Shende et al., Synthesis of Quantum Logic Circuits, Apr. 18, 2006, 19 Pages.

(Continued)

*Primary Examiner* — Suchin Parihar
(74) *Attorney, Agent, or Firm* — Amin, Turocy & Watson, LLP

(57) ABSTRACT

Techniques facilitating cached result use through quantum gate rewrite are provided. In one example, a computer-implemented method comprises converting, by a device operatively coupled to a processor, an input quantum circuit to a normalized form, resulting in a normalized quantum circuit; detecting, by the device, a match between the normalized quantum circuit and a cached quantum circuit among a set of cached quantum circuits; and providing, by the device, a cached run result of the cached quantum circuit based on the detecting.

20 Claims, 13 Drawing Sheets

(56) References Cited

U.S. PATENT DOCUMENTS

| | | |
|---|---|---|
| 2006/0123363 A1 | 6/2006 | Williams et al. |
| 2014/0026107 A1* | 1/2014 | Bocharov ............. G06F 30/327 |
| | | 716/101 |
| 2014/0040849 A1 | 2/2014 | Wecker |
| 2015/0262073 A1 | 9/2015 | Lanting |
| 2015/0339417 A1 | 11/2015 | Garcia-Ramirez et al. |
| 2017/0032272 A1 | 2/2017 | Bocharov et al. |
| 2017/0147303 A1 | 5/2017 | Amy et al. |
| 2017/0364796 A1* | 12/2017 | Wiebe ..................... G06N 10/00 |
| 2018/0046933 A1 | 2/2018 | La Cour et al. |
| 2018/0129966 A1 | 5/2018 | Kliuchnikov et al. |
| 2018/0181685 A1 | 6/2018 | Roetteler et al. |
| 2018/0267933 A1 | 9/2018 | Lanting |
| 2018/0330264 A1 | 11/2018 | Lanting et al. |
| 2019/0220497 A1 | 7/2019 | Wiebe et al. |
| 2019/0354316 A1 | 11/2019 | Rhee et al. |
| 2020/0074316 A1 | 3/2020 | Ma et al. |
| 2020/0099391 A1* | 3/2020 | Quintin .................. G06N 10/00 |
| 2020/0119737 A1 | 4/2020 | Hamilton et al. |
| 2020/0258000 A1 | 8/2020 | Martinis et al. |
| 2020/0272926 A1* | 8/2020 | Chaplin .................. G06F 8/443 |
| 2020/0342344 A1* | 10/2020 | Gambetta ............. G06N 20/00 |
| 2021/0192114 A1* | 6/2021 | Boixo Castrillo ..... G06N 10/00 |
| 2021/0255856 A1* | 8/2021 | Cao ........................ G06N 10/00 |

OTHER PUBLICATIONS

International Search Report and Written Opinion received for PCT Application Serial No. PCT/EP2019/081374 dated Feb. 28, 2020, 15 pages.

Bocharov et al., "Resource-Optimal Single-Qubit Quantum Circuits", vol. 109, No. 19, American Physical Society, Nov. 9, 2012, pp. 190501-1-190501-5.

Maslov et al., "Quantum Circuit Simplification Using Templates", Mar. 7, 2005, pp. 1208-1213.

Non-Final Office Action received for U.S. Appl. No. 16/201,279 dated Apr. 17, 2020, 26 pages.

Notice of Allowance received for U.S. Appl. No. 16/201,279 dated Sep. 24, 2020, 26 pages.

List of IBM Patents or Patent Applications Treated as Related.

* cited by examiner

CACHED RESULT USE THROUGH QUANTUM GATE REWRITE

BACKGROUND

The subject disclosure relates to quantum computing, and more specifically, to techniques for improving the functionality of a quantum computer.

As computer technology advances and conventional computing devices decrease in physical scale, a growing interest has been placed on quantum computing as a technique by which computing technology can continue to advance past the physical limitations of traditional (classical) computers.

Quantum computing quantum programs, can be expressed in the form of a quantum circuit, e.g., a circuit that includes respective quantum bits (qubits) and respective quantum gates that represent interaction between pairs of qubits. A quantum circuit designed in this manner can then be mapped onto a quantum computing architecture to facilitate execution of the quantum program. However, executing quantum programs on current quantum hardware can be significantly expensive in terms of power usage, time, maintenance costs, and/or other criteria.

Conventional techniques for reducing the costs of executing a quantum program generally involve optimizing the associated quantum circuit. For instance, Williams et al., "METHOD AND APPARATUS FOR AUTOMATIC DESIGN OF QUANTUM CIRCUITS," U.S. Patent Application Publication No. 2006/0123363, provides techniques for reducing the gate count of a quantum circuit via "compactification techniques." In particular, paragraph 83 of Williams et al. states that "[o]ne embodiment applies deterministic circuit reduction operators to look for a pattern among sub-circuits and/or gates that can be eliminated or rewritten to a more compact gate." In addition to optimization of a quantum program and/or its underlying quantum circuit(s), there exists a need in the art for solutions to address the problem of further reducing the cost associated with executing quantum programs on quantum hardware.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate cached result use through quantum gate rewrite are described.

According to an embodiment, a system can include a memory that stores computer executable components and a processor that executes computer executable components stored in the memory. The computer executable components can include a gate rewrite component that converts an input quantum circuit to a normalized form, resulting in a normalized quantum circuit, a cache lookup component that detects a match between the normalized quantum circuit and a cached quantum circuit among a set of cached quantum circuits, and a result provision component that provides a cached run result of the cached quantum circuit based on the cache lookup component detecting the match. The system according to this embodiment has the advantages of improved operation of a quantum computer and reduced operating cost of a quantum computer (in terms of, e.g., power consumption, processing cycles required, maintenance costs, etc.), among other advantages.

In certain embodiments, the result provision component can apply the cached run result to the normalized quantum circuit in place of running the normalized quantum circuit. The system according to this embodiment has the advantage of reducing costs associated with operating a quantum computer, e.g., by executing fewer quantum programs, among other advantages. In other embodiments, the computer executable components can further include an authorization component that requests user authorization for application of the cached run result, and the result provision component can apply the cached run result to the normalized quantum circuit based on the authorization component obtaining the user authorization. Also or alternatively, the result provision component can run the normalized quantum circuit to obtain an independent run result for the normalized quantum circuit based on the authorization component failing to obtain the user authorization. The system according to these embodiments has the advantage of increased user control over execution of a quantum program, among other advantages. In further embodiments, the computer executable components can further include a guidance component that can generate respective explanations for changes made to the input quantum circuit by the gate rewrite component and provide the respective explanations with the cached run result. The system according to this embodiment has the advantage of providing additional insight to quantum programmers regarding their quantum programs, among other advantages. In still other embodiments, the gate rewrite component can detect a non-normalized gate configuration in the input quantum circuit having a normalized configuration equivalent and replace the non-normalized gate configuration with the normalized configuration equivalent. The system according to this embodiment has the advantage of improved relevance of provided cached run results, among other advantages. In yet other embodiments, the gate rewrite component can detect a non-normalized gate configuration in a sub-circuit of the input quantum circuit having a normalized configuration equivalent and replace the non-normalized gate configuration with the normalized configuration equivalent, resulting in a normalized sub-circuit. Additionally, the sub-circuit can be a first sub-circuit, the non-normalized gate configuration can be a first non-normalized gate configuration, and the gate rewrite component can detect a second non-normalized gate configuration in a second sub-circuit of the input quantum circuit based on replacing the first sub-circuit with the normalized sub-circuit. The system according to these embodiments has the advantage of further improved relevance of provided cached run results, among other advantages.

According to another embodiment, a computer-implemented method can include converting, by a device operatively coupled to a processor, an input quantum circuit to a normalized form, resulting in a normalized quantum circuit; detecting, by the device, a match between the normalized quantum circuit and a cached quantum circuit among a set of cached quantum circuits; and providing, by the device, a cached run result of the cached quantum circuit based on the detecting. The computer-implemented method according to this embodiment has the advantages of improved operation of a quantum computer and reduced operating cost of a quantum computer (in terms of, e.g., power consumption, processing cycles required, maintenance costs, etc.), among other advantages.

In certain embodiments, the providing can include applying the cached run result to the normalized quantum circuit in place of running the normalized quantum circuit. The computer-implemented method according to this embodiment has the advantage of reducing costs associated with operating a quantum computer, e.g., by executing fewer quantum programs, among other advantages. In other embodiments, the computer-implemented method can further include requesting, by the device, a user authorization for the cached run result, and the providing can include applying the cached run result to the normalized quantum circuit based on obtaining the user authorization. The computer-implemented method according to this embodiment has the advantage of increased user control over execution of a quantum program, among other advantages. In still other embodiments, the computer-implemented method can further include generating, by the device, respective explanations for changes made to the input quantum circuit by the converting; and providing, by the device, the respective explanations with the cached run result. The system according to this embodiment has the advantage of providing additional insight to quantum programmers regarding their quantum programs, among other advantages. In yet other embodiments, the converting can include detecting a non-normalized gate configuration in the input quantum circuit having a normalized configuration equivalent and replacing the non-normalized gate configuration with the normalized configuration equivalent. Also or alternatively, the converting can include detecting a non-normalized gate configuration in a sub-circuit of the input quantum circuit having a normalized configuration equivalent and replacing the non-normalized gate configuration with the normalized configuration equivalent. The computer-implemented method according to these embodiments has the advantage of improved relevance of provided cached run results, among other advantages.

According to a further embodiment, a computer program product for quantum circuit result management can include a computer readable storage medium having program instructions embodied therewith. The program instructions can be executable by a processing component to cause the processing component to convert an input quantum circuit to a normalized form, resulting in a normalized quantum circuit, detect a match between the normalized quantum circuit and a cached quantum circuit among a set of cached quantum circuits, and provide a cached run result of the cached quantum circuit based on the match being detected. The computer program product according to this embodiment has the advantages of improved operation of a quantum computer and reduced operating cost of a quantum computer (in terms of, e.g., power consumption, processing cycles required, maintenance costs, etc.), among other advantages.

In certain embodiments, the program instructions can cause the processor to apply the cached run result to the normalized quantum circuit in place of running the normalized quantum circuit. The computer program product according to this embodiment has the advantage of reducing costs associated with operating a quantum computer, e.g., by executing fewer quantum programs, among other advantages. In other embodiments, the program instructions can cause the processor to detect a non-normalized gate configuration in the input quantum circuit having a normalized configuration equivalent and replace the non-normalized gate configuration with the normalized configuration equivalent. The computer program product according to this embodiment has the advantage of improved relevance of provided cached run results, among other advantages.

According to an additional embodiment, a system can include a memory that stores computer executable components and a processor that executes computer executable components stored in the memory. The computer executable components can include a gate rewrite component that converts an input quantum circuit to a normalized form, resulting in a normalized quantum circuit, a statistical analysis component that computes a degree of equivalency between the normalized quantum circuit and a cached quantum circuit, and a result provision component that provides a cached run result of the cached quantum circuit based on the degree of equivalency between the normalized quantum circuit and the cached quantum circuit being greater than a threshold. The system according to this embodiment has the advantages of improved operation of a quantum computer and reduced operating cost of a quantum computer (in terms of, e.g., power consumption, processing cycles required, maintenance costs, etc.), among other advantages.

In certain embodiments, the computer executable components can further include an authorization component that requests user authorization for application of the cached run result, and the result provision component can apply the cached run result to the normalized quantum circuit in place of running the normalized quantum circuit based on the authorization component obtaining the user authorization. The system according to this embodiment has the advantage of increased user control over execution of a quantum program, among other advantages. In other embodiments, the statistical analysis component can compute the degree of equivalency between the normalized quantum circuit and the cached quantum circuit by generating an estimated run result of the normalized quantum circuit and comparing the estimated run result to the cached run result of the cached quantum circuit. The system according to this embodiment has the advantage of improved relevance of provided cached run results, among other advantages. In additional embodiments, the gate rewrite component can detect a non-normalized gate configuration in the input quantum circuit having a normalized configuration equivalent and replace the non-normalized gate configuration with the normalized configuration equivalent. The system according to this embodiment has the advantage of further improved relevance of provided cached run results, among other advantages.

According to yet another embodiment, a computer-implemented method can include converting, by a device operatively coupled to a processor, an input quantum circuit to a normalized form, resulting in a normalized quantum circuit; determining, by the device, a degree of equivalency between the normalized quantum circuit and a cached quantum circuit; and providing, by the device, a cached run result of the cached quantum circuit based on the degree of equivalency between the normalized quantum circuit and the cached quantum circuit being greater than a threshold. The computer-implemented method according to this embodiment has the advantages of improved operation of a quantum computer and reduced operating cost of a quantum computer (in terms of, e.g., power consumption, processing cycles required, maintenance costs, etc.), among other advantages.

In certain embodiments, the computer-implemented method can further include requesting, by the device, a user authorization for the cached run result, and the providing can include applying the cached run result to the normalized quantum circuit in place of running the normalized quantum circuit based on obtaining the user authorization. The computer-implemented method according to this embodiment has the advantage of increased user control over execution of a quantum program, among other advantages. In other embodiments, the determining can include generating an estimated run result of the normalized quantum circuit and comparing the estimated run result to the cached run result of the cached quantum circuit. The computer-implemented method according to this embodiment has the advantage of improved relevance of provided cached run results, among other advantages. In still other embodiments, the converting can include detecting a non-normalized gate configuration in the input quantum circuit having a normalized configuration equivalent and replacing the non-normalized gate configuration with the normalized configuration equivalent. The computer-implemented method according to this embodiment has the advantage of further improved relevance of provided cached run results, among other advantages.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
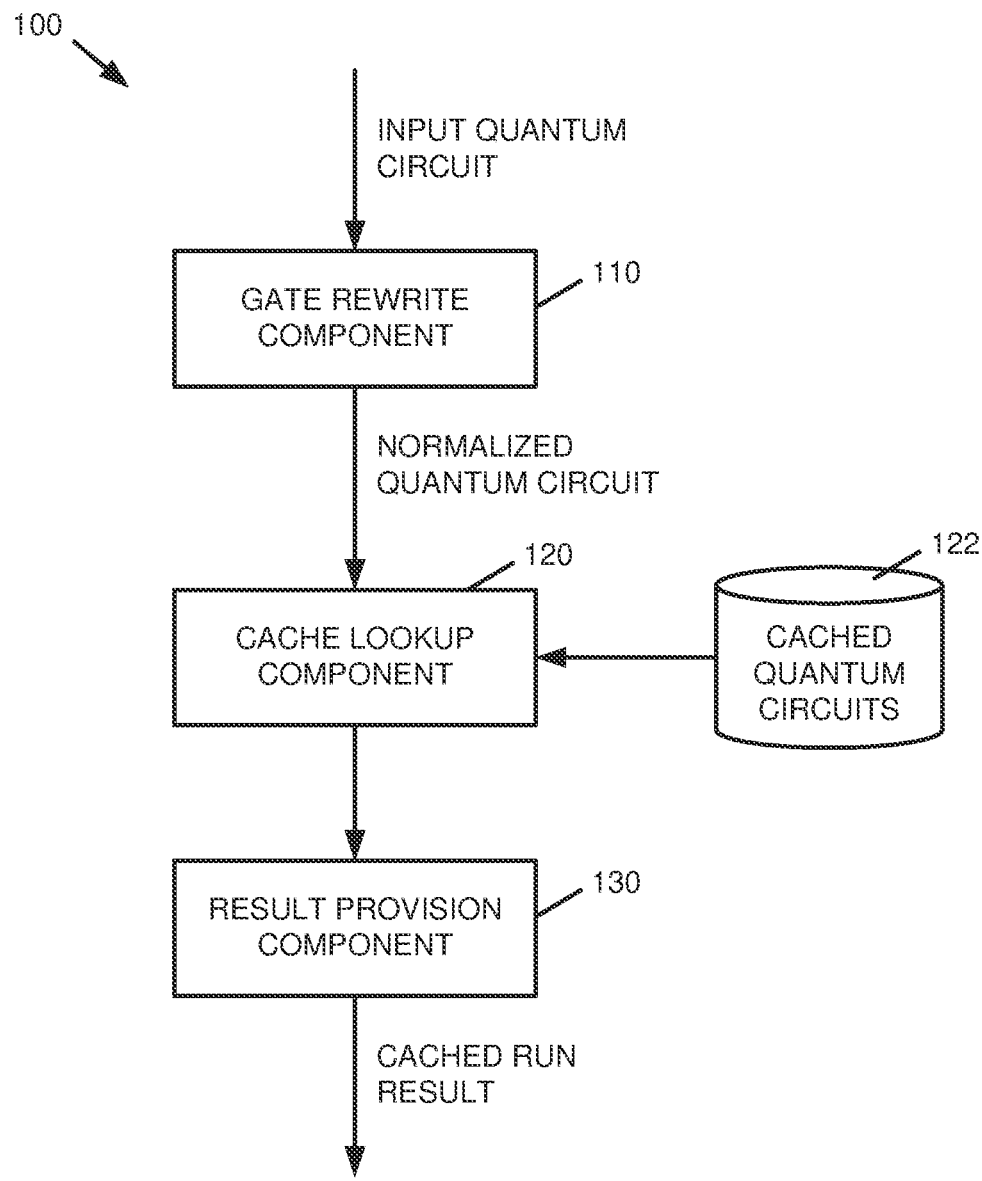
FIG. 1 is a block diagram of a system that facilitates cached result use through quantum gate rewrite according to one or more embodiments described herein.

With reference now to the drawings, FIG. 1 illustrates a block diagram of a system 100 that facilitates cached result use through quantum gate rewrite according to one or more embodiments described herein. As shown in FIG. 1, system 100 can include a gate rewrite component 110 that can convert an input quantum circuit into a normalized (canonical) form. Techniques by which the gate rewrite component 110 can convert an input quantum circuit into a normalized quantum circuit are described in further detail below with respect to FIGS. 2-3. System 100 can also include a cache lookup component 120 that can detect a match between the normalized quantum circuit produced by the gate rewrite component 110 and a cached quantum circuit, e.g., among a set of cached quantum circuits 122. System 100 can further include a result provision component 130 that can provide a cached run result of the cached quantum circuit identified by the cache lookup component 120, e.g., based on the cache lookup component 120 detecting a match between the normalized quantum circuit and the cached quantum circuit.

In an aspect, the result provision component 130 can, where applicable, apply a cached run result to the normalized quantum circuit in place of independently running the normalized quantum circuit, e.g., on quantum hardware. This, in turn, provides a solution to the problem of decreasing costs associated with running a quantum computer, e.g., by reducing the number of quantum programs that are executed by the quantum computer. In various aspects, by facilitating the use of cached run results for quantum programs and/or circuits, various advantages can be realized relating to the functionality of a quantum computer. These advantages can include, but are not limited to, reduced power usage by a quantum computer, reduced processing cycles and/or other computing resources used by a quantum computer, reduced maintenance and/or operating costs associated with operating a quantum computer and/or providing a quantum computing service, reduced wear on a quantum computer associated with normal operation of the quantum computer, etc. Other advantages could also be realized.

By implementing system 100 as shown by FIG. 1, a user of a quantum computer can be given the option of running a quantum program or to reuse results from prior quantum programs. In some instances, use of a prior (cached) run result can be beneficial to a user in order to reduce costs and/or computing resources associated with independently executing a quantum program. Examples of factors that can be utilized to facilitate user authorization for cached run results are described in further detail with respect to FIG. 4. Alternatively, cached run results can be applied automatically when a match is found by the cache lookup component 120.

In an aspect, a quantum program can be structured as a quantum circuit, which in turn can be composed of quantum bits (qubits) and quantum gates in a similar manner to the classical bits and gates of electronic circuits. However, due to differences in programming style, lack of knowledge of quantum programming best practices (e.g., especially among beginner or novice programmers), and/or other factors, circuits with the same semantics (or with the intent to have the same semantics) can be written differently in some cases. This can in some cases cause the cache lookup component 120 to encounter difficulty in matching an input quantum circuit with the set of cached quantum circuits 122. While some of these issues can potentially be resolved via simulation of a quantum circuit on a classical computer, classical simulation quickly becomes infeasible as the number of qubits associated with the circuit increases.

In order to account for potential differences in quantum circuit design as described above, the gate rewrite component 110 can convert an input quantum circuit, as well as respective ones of the set of cached quantum circuits 122, into a normalized form, thereby mitigating the effects of differences between logically equivalent circuits and increasing the ability of the cache lookup component 120 to find matches between an input quantum circuit and a cached quantum circuit even when the structure of the input quantum circuit is not an identical match with that of the cached quantum circuit.

Figure 2:
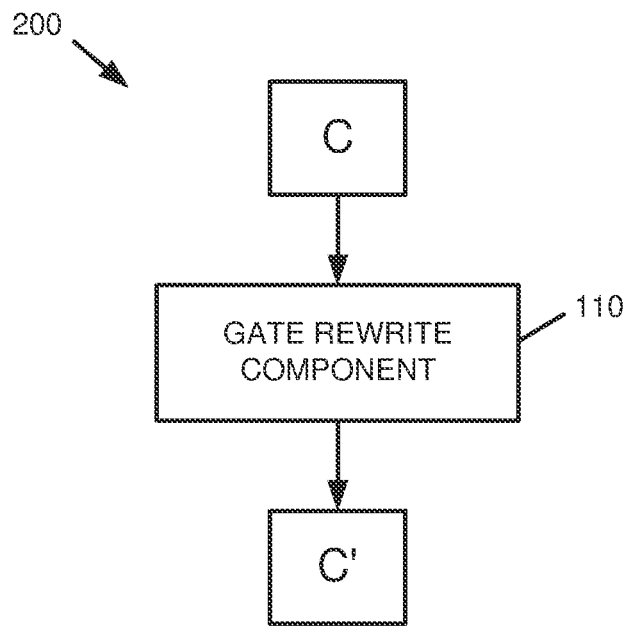
FIG. 2-3 are diagrams of example quantum circuit normalization operations that can be performed according to one or more embodiments described herein.
Figure 3:
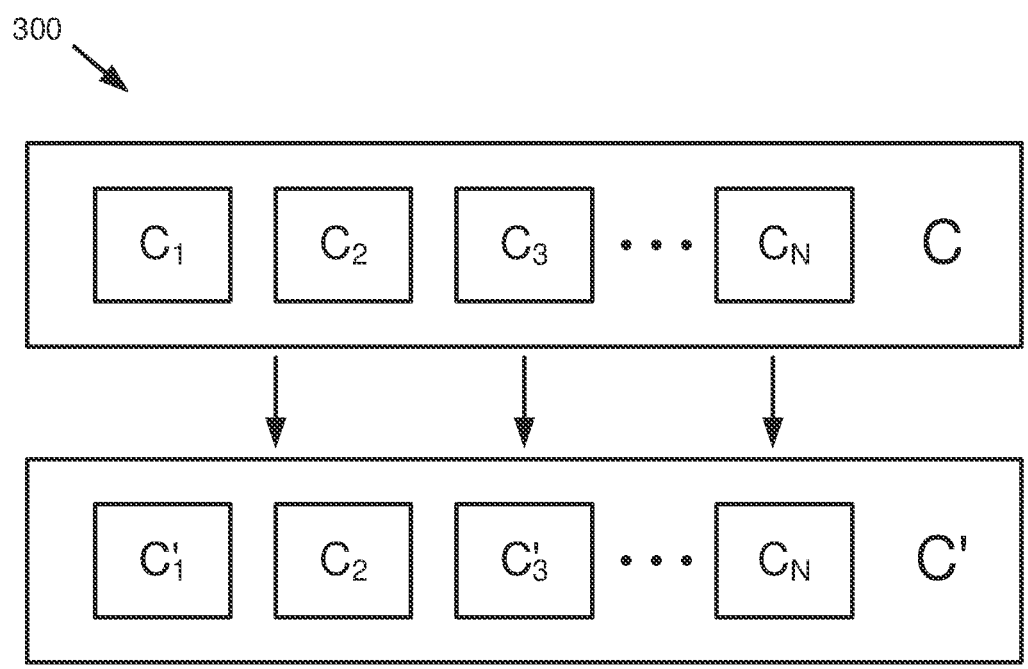

An example gate rewrite operation that can be performed by the gate rewrite component 110 is shown by diagram 200 in FIG. 2. As shown by diagram 200, the gate rewrite component 110 can detect one or more non-normalized (non-canonical) gate configurations in an input quantum circuit C that have normalized (canonical) configuration equivalents. The gate rewrite component 110 can then replace the non-normalized gate configuration(s) in the input quantum circuit C with their corresponding normalized configuration equivalents, resulting in a normalized quantum circuit C'.

In general, the gate rewrite component 110 can utilize one or more logic optimization techniques to make and/or propose circuit rewrites to an input quantum circuit in order to allow prior executions, e.g., of a cached quantum circuit, to replace current execution of the input quantum circuit. In an aspect, the gate rewrite component 110 can analyze the input quantum circuit, e.g., by analyzing a diagram and/or other representation of the circuit. The gate rewrite component 110 can then identify anomalies in the gate configuration of the input circuit and replace respective identified anomalies with corresponding normalized configurations. This modified (normalized) circuit can then be utilized by the cache lookup component 120 for comparison to previously run programs or circuits.

In some aspects, non-normalized gate configurations and/or other anomalies in an input quantum circuit can be detected by the gate rewrite component 110 on one or more hierarchical levels. By way of example, the gate rewrite component 110 can detect anomalies in an input quantum circuit at the circuit level and/or the sub-circuit or gate level. As a non-limiting example of circuit-level modification, the gate rewrite component 110 can detect that an input quantum circuit is similar to a known quantum circuit, for example a quantum Fourier transform (QFT) circuit. For instance, if the gate rewrite component 110 determines that the input quantum circuit could be transformed into a QFT circuit with minimal modification, e.g., by adding, removing or changing a single gate or a small number of gates in relation to the size of the circuit, the gate rewrite component 110 can conclude that the input quantum circuit is a QFT circuit. Subsequently, the gate rewrite component 110 can pass a canonical QFT circuit to the cache lookup component 120 for further processing. Sub-circuit-level modification is described in further detail below with respect to FIG. 3.

In an aspect, certain factors, such as the nature and/or extent of differences between an input quantum circuit and a corresponding known quantum circuit, the estimated skill level of the user submitting the input quantum circuit, and/or other factors can be used in determining whether the input quantum circuit is, or is intended to be, equivalent to a known quantum circuit. For example, the gate rewrite component 110 can implement natural language processing and/or other techniques to determine the intended functionality of an input quantum circuit from comments and/or other text accompanying the input quantum circuit. Thus, as a specific example, if an input quantum circuit resembles a QFT circuit and comments and/or other text accompanying the input quantum circuit indicate that the user intends the input quantum circuit to be a QFT circuit, the gate rewrite component 110 can determine that the input quantum circuit is highly likely to be equivalent to a QFT circuit. Conversely, if the input quantum circuit resembles a QFT circuit but comments and/or other text accompanying the circuit indicate that the circuit is not intended to be a QFT circuit, the gate rewrite component 110 can regard the input quantum circuit as less likely to be a QFT circuit. This can, in turn, lead the gate rewrite component 110 to examine other possible known quantum circuits in comparison to the input quantum circuit. Various techniques by which the skill level of a user can be estimated and utilized in circuit modification are described in further detail below with respect to FIGS. 4-6.

In an aspect, the gate rewrite component 110 can operate on an input quantum circuit in a hierarchical fashion, e.g., by first examining respective sub-circuits that make up the input quantum circuit. For instance, as shown by diagram 300 in FIG. 3, the gate rewrite component 110 can break up an input quantum circuit C into one or more sub-circuits, here N sub-circuits $C_1$-$C_N$. The gate rewrite component 110 can then modify one or more of the sub-circuits as appropriate, resulting in one or more normalized sub-circuits $C_1'$-$C_N'$ that collectively form a normalized quantum circuit C'. Stated another way, the gate rewrite component 110 can detect a non-normalized gate configuration in a sub-circuit of an input quantum circuit that has a normalized configuration equivalent and replace the non-normalized gate configuration with the normalized configuration equivalent.

In an aspect, the sub-circuits shown in diagram 300 can be of any suitable size or complexity. For instance, a large quantum circuit could be composed of multiple sub-circuits that could themselves be standalone quantum circuits, such as the QFT circuit used in the examples above. Alternatively, respective sub-circuits analyzed by the gate rewrite component 110 as shown in diagram 300 can be respective gates or sets of gates that have a known canonical function. By way of example, a sub-circuit can include a pattern of controlled-NOT (CNOT) gates and Hadamard gates that collectively form a SWAP gate. Other examples are also possible.

The sub-circuits shown by diagram 300 represent a single hierarchical layer that can be utilized by the gate rewrite component 110 in analyzing an input quantum circuit. While not shown in diagram 300, respective sub-circuits can themselves be divided into further sub-circuits as appropriate to facilitate a full analysis by the gate rewrite component 110. By way of non-limiting example, an input quantum circuit can have a sub-circuit that contains a QFT circuit, and the QFT circuit can be further divided into additional sub-circuits that contain gate configurations, such as SWAP gates or the like, that are used by the QFT circuit. Other examples are also possible. In an aspect, the gate rewrite component 110 can divide an input quantum circuit into as many hierarchical layers of sub-circuits as are needed to facilitate a full analysis of the input quantum circuit.

In an aspect, upon replacing a sub-circuit at a given hierarchical of an input quantum circuit with a normalized equivalent, the gate rewrite component 110 can utilize the normalized equivalent to identify further normalized configuration equivalents in other sub-circuits or the input quantum circuit as a whole. Stated another way, if the gate rewrite component 110 discovers a first non-normalized gate configuration in a first sub-circuit of an input quantum circuit, the gate rewrite component 110 can detect other non-normalized gate configurations in other sub-circuits of the input quantum circuit based on replacing the first sub-circuit with its normalized equivalent. For instance, upon matching a smaller section of a circuit, the gate rewrite component 110 can replace that section with a canonical form, and then look for additional matches using that replaced section. By matching sub-circuits of a larger quantum circuit to potential normalized forms hierarchically, the gate rewrite component 110 can facilitate increased efficiency and accuracy in determining normalized gate configurations in the circuit. This can be of particular usefulness in the case of large input quantum circuits to limit analysis of the circuit to only portions of the circuit that differ from known normalized sub-circuits.

Figure 4:
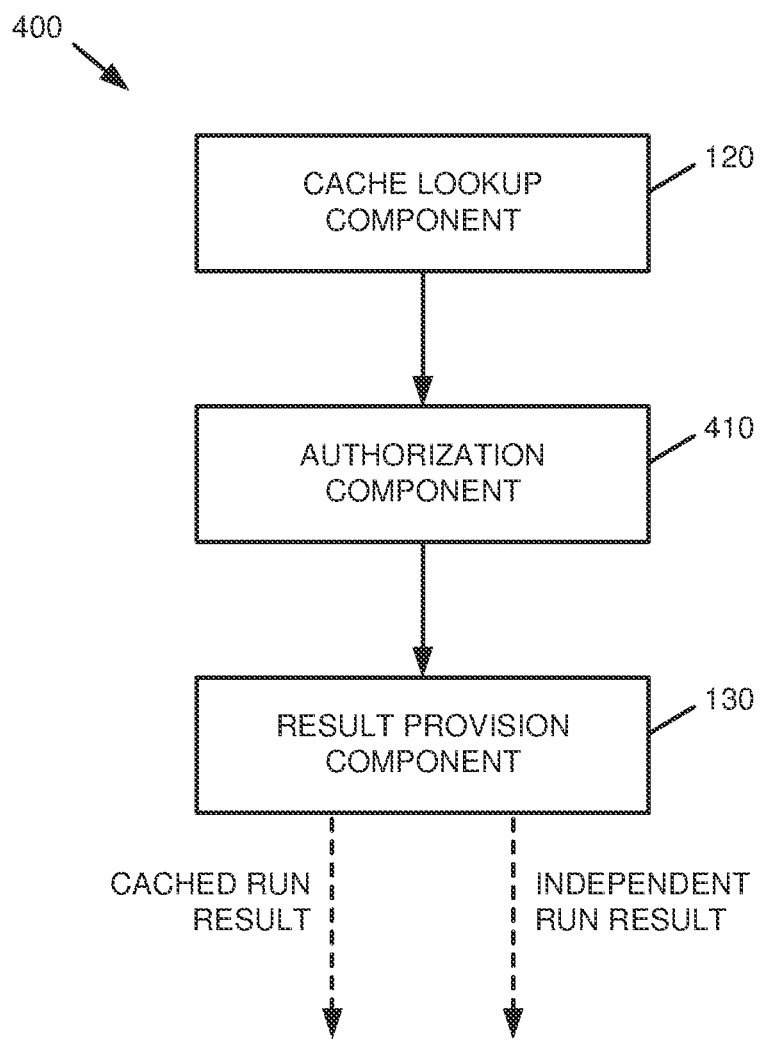
FIG. 4 is a block diagram of a system that facilitates managing user authorization for cached run results according to one or more embodiments described herein.

Turning now to FIG. 4, a block diagram of a system 400 that facilitates managing user authorization for cached run results according to one or more embodiments described herein is illustrated. Repetitive description of like elements employed in other embodiments described herein is omitted for sake of brevity. As shown in FIG. 4, system 400 can include an authorization component 410 that can request user authorization for application of a cached run result. The authorization component 410 can request authorization from a user via, e.g., a user interface and/or any other suitable means by which a user can provide authorization to system 400.

In an aspect, the authorization component 410 can cause the result provision component 130 to operate in different ways, e.g., based on whether authorization for a cached run result is received. For instance, the result provision component 130 can apply a cached run result to a normalized quantum circuit based on the authorization component 410 obtaining user authorization for application of the cached run result. Alternatively, the result provision component 130 can run the normalized quantum circuit, thereby obtaining an independent run result for the normalized quantum circuit, based on user authorization for application of the cached run result not being received and/or the authorization component 410 otherwise failing to obtain the necessary user authorization.

In another aspect, one or more system components, e.g., the gate rewrite component (not shown in FIG. 4) or the result provision component 130, can analyze a provided input quantum circuit and/or information accompanying the input quantum circuit (such as comments or other annotations) to determine the approximate skill level of a user that submitted the input quantum circuit. For instance, the approximate skill level of a user can be determined based on factors such as program and/or circuit structure, presence or absence of errors in gate construction and/or program syntax, presence or absence of certain words or phrases in comments or other text accompanying the program, or the like. The estimated skill level of the user can then be utilized by the authorization component 410 as a factor in determining whether, or to what extent, to request user authorization for use of a cached run result. For example, if a user is estimated to be an expert user, the authorization component 410 can provide the user with multiple potential cached run results that can vary with respect to noise profiles, specific gate counts and/or structures, or other criteria, to enable the user to analyze the different run results and select one or more particular results that meet his or her specific needs. Alternatively, if the user is determined to be a beginner or novice user, the authorization component 410 can automatically use the cached run result (e.g., without prompting the user for authorization) or prompt the user for authorization in a limited manner, e.g., for only a single cached run result or a small number of cached run results.

Figure 5:
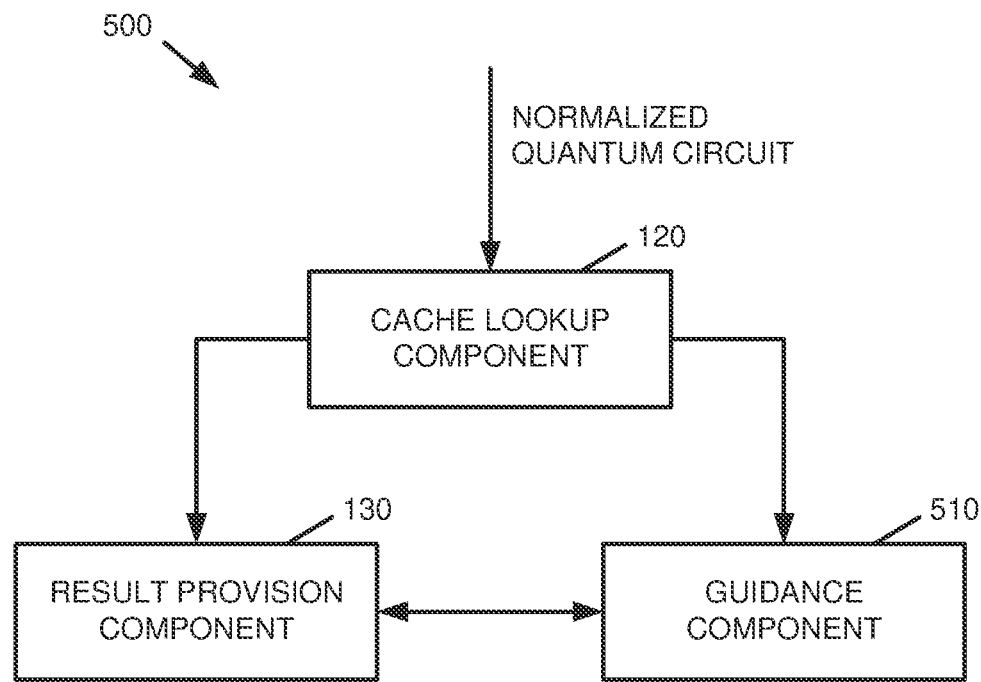
FIG. 5 is a block diagram of a system that facilitates providing user guidance with respect to cached run results according to one or more embodiments described herein.

Turning now to FIG. 5, a block diagram of a system 500 that facilitates providing user guidance with respect to cached run results according to one or more embodiments described herein is illustrated. Repetitive description of like elements employed in other embodiments described herein is omitted for sake of brevity. As shown in FIG. 5, system 500 includes a guidance component 510 that can generate respective explanations for changes made to the input quantum circuit as made by the gate rewrite component 110 and provide the respective explanations with the cached run result, e.g., as provided by the result provision component 130.

In an aspect, the guidance component 510 can be configured to provide context-appropriate explanations and/or other guidance for a particular setting in which system 500 is deployed and/or used. For instance, in an academic setting, students and/or other users that are learning quantum programming can in some cases use inefficient or non-standard gate configurations. In this scenario, the guidance component 510 can reconcile these gate configurations with a canonical form and provide explanations of the changes made to the user in order to help educate students and/or other learning users, simplify the grading of assignments, etc. Alternatively, in a scientific setting, the guidance component 510 can provide more detailed guidance regarding reasoning for specific gate rewrites as well as the impact of those gate rewrites on circuit noise, result fidelity, and/or other factors. Other settings and/or contexts could also be considered by the guidance component 510.

Figure 6:
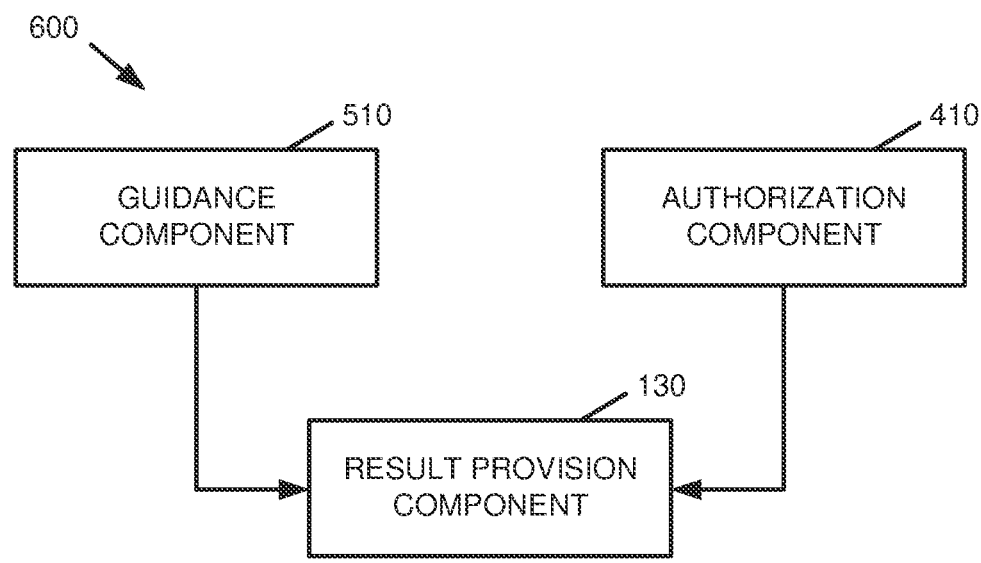
FIG. 6 is a block diagram of a system that facilitates managing user guidance and authorization with respect to cached run results according to one or more embodiments described herein.

In another aspect, explanations and/or other guidance provided via the guidance component 510 can be utilized to facilitate user authorization for cached run results via the authorization component 410, as shown by system 600 in FIG. 6. More particularly, the guidance component 510 can provide a user with explanations and/or other guidance relating to circuit alterations made by the gate rewrite component 110 and/or available cached result sets, thereby enabling the user to review the changes and/or available cached results before authorizing use of the cached results.

In a similar manner to that described above with respect to FIGS. 4-5, the estimated skill level of the user, and/or the setting in which system 600 is employed, can affect the nature of the explanations provided by the guidance component 510 and their relation to whether, or to what extent, the authorization component 410 seeks user authorization. For example, in the case of a beginning or novice programmer in an academic setting, system 600 can be more likely to regard non-standard gate configurations and/or other deviations from canonical form as mistakes in the input quantum circuit. As such, any changes made to the input quantum circuit could be automatically applied (e.g., bypassing the authorization component 410) upon providing explanations of the changes via the guidance component 510. As another example, in the case of a highly skilled user in a scientific or other setting, system 600 can be more likely to regard non-standard gate configurations and/or other deviations from canonical form as genuine differences in circuit design. As such, the guidance component 510 can provide the user with explanations of the differences and enable the user, via the authorization component 410, to confirm whether the differences were intended or if a corresponding canonical form should be used instead.

As a further example, the guidance component 510 can provide a user with explanations regarding multiple potential cached result sets, such that the user can select one or more of the sets for use via the authorization component 410. For instance, the guidance component 510 can provide explanations regarding multiple variations of an input quantum circuit and/or multiple cached run results for the input quantum circuit. The user could then select one or more of the circuit variations and/or cached run results for use via the authorization component 410. Similar to the examples provided above, the extent to which multiple circuit variations and/or result sets are provided to a user via system 600 can be based on the approximate skill level of the user. For instance, a highly skilled user can be presented the above options while a student or less skilled user can be presented with only a single option, e.g., a lowest-noise result set, a most efficient circuit variation, etc.

Figure 7:
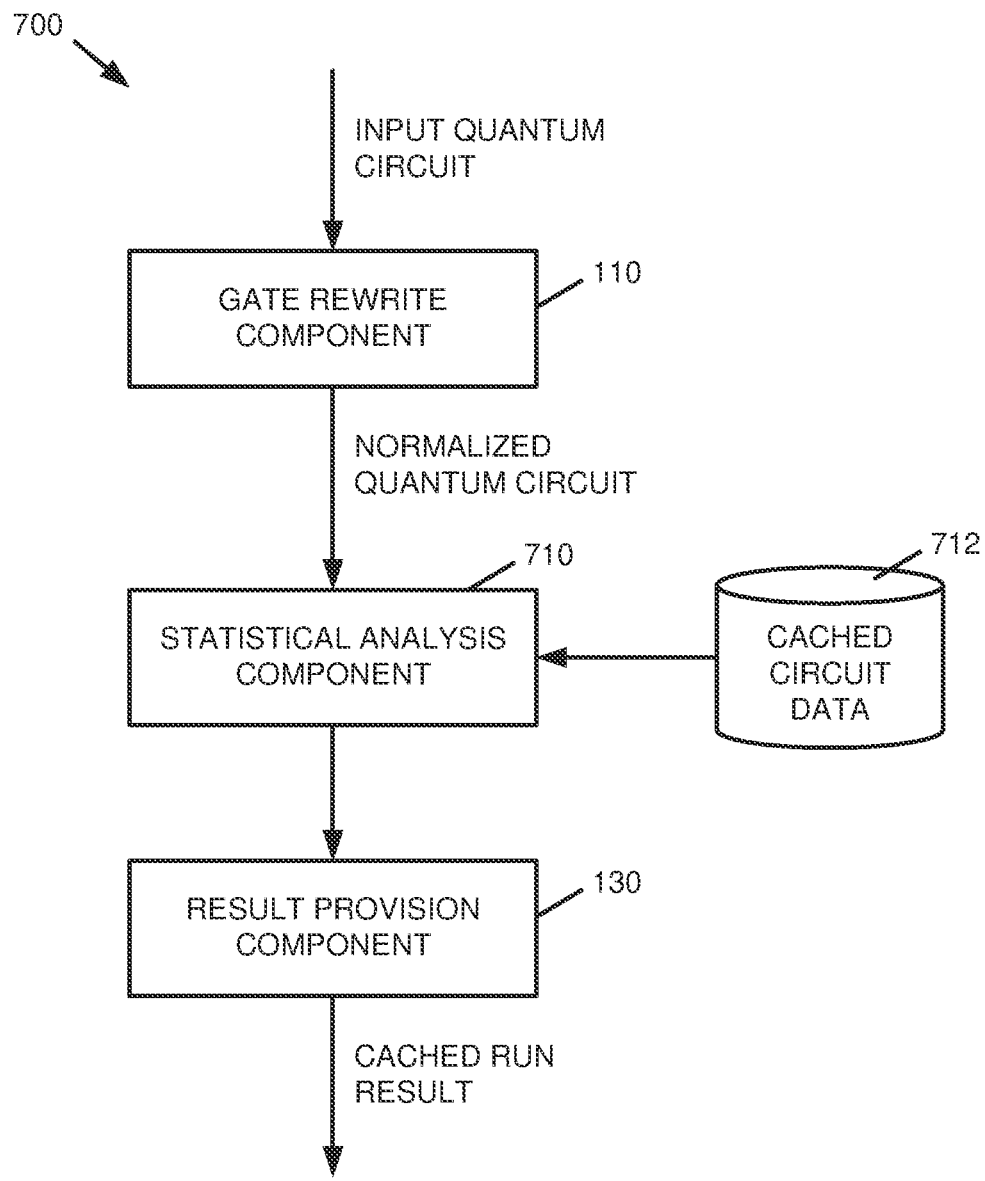
FIG. 7 is a block diagram of an alternative system that facilitates cached result use through quantum gate rewrite according to one or more embodiments described herein.

Referring next to FIG. 7, a block diagram of an alternative system 700 that facilitates cached result use through quantum gate rewrite according to one or more embodiments described herein is illustrated. Repetitive description of like elements employed in other embodiments described herein is omitted for sake of brevity. As shown in FIG. 7, system 700 can include a gate rewrite component 110 that can convert an input quantum circuit to a normalized form, e.g., as described above with respect to FIGS. 2-3. System 700 as shown in FIG. 7 further includes a statistical analysis component 710 that can compute a degree of equivalency between the normalized quantum circuit generated by the gate rewrite component 110 and a cached quantum circuit, e.g., as provided via a set of cached circuit data 712. If the degree of equivalency between the normalized quantum circuit and the cached quantum circuit is greater than a threshold, the result provision component 130 can provide a cached run result of the cached quantum circuit, e.g., as described with respect to the various embodiments above.

In an aspect, the statistical analysis component 710 can compute the degree of equivalency between the normalized quantum circuit and a cached quantum circuit associated with the cached circuit data 712 by generating an estimated run result of the normalized quantum circuit and comparing the estimated run result of the cached run result of the cached quantum circuit. An estimated run result of the normalized quantum circuit can be obtained by, e.g., symbolically executing the normalized quantum circuit, executing the normalized quantum circuit on a classical simulator, etc. Also or alternatively, one or more sub-circuits of the normalized quantum circuit can be symbolically executed and/or simulated in place of the entire circuit. As another alternative, respective sub-circuits of the normalized quantum circuit can be run on quantum hardware to obtain estimated run results of the respective sub-circuits, which can then be compared to results for corresponding sub-circuits of the cached quantum circuit. Other methods could also be used.

In another aspect, the statistical analysis component 710 can compute the degree of equivalency between the normalized quantum circuit and a cached quantum circuit associated with the cached circuit data 712 by determining a level of correlation between the normalized quantum circuit and the cached quantum circuit, e.g., in terms of structure, functionality, and/or other factors. A level of correlation obtained by the statistical analysis component 710 in this manner can be used in addition to, or in place of, estimated run results as described above.

Figure 8:
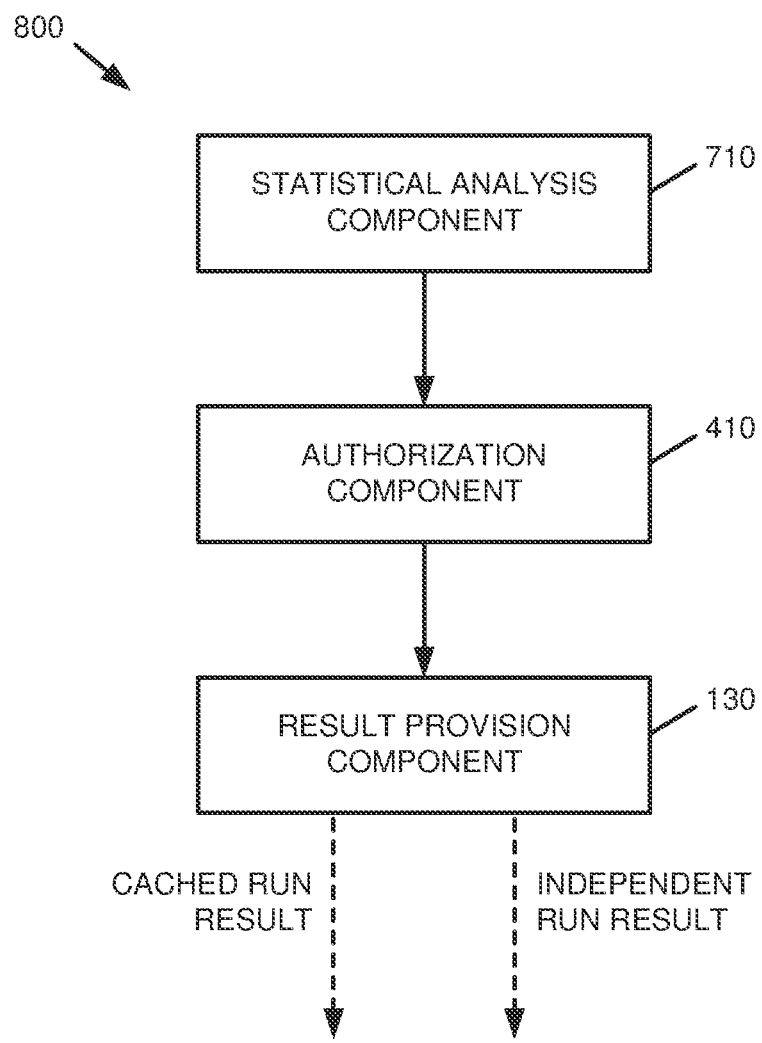
FIG. 8 is a block diagram of an alternative system that facilitates managing user authorization for cached run results according to one or more embodiments described herein.

In the event that the statistical analysis component 710 finds a cached quantum circuit that is sufficiently equivalent to the normalized quantum circuit, a user can be prompted for authorization to use the associated cached run result via an authorization component 410, as shown by system 800 in FIG. 8. Similar to that described above with respect to FIG. 4, the authorization component 410 shown in FIG. 8 can request user authorization for application of the cached run result. In response to the authorization component 410 obtaining the user authorization, the result provision component 130 can apply the cached run result to the normalized quantum circuit in place of independently running the normalized quantum circuit. Alternatively, if user authorization is not provided, the result provision component 130 can instead independently run the normalized quantum circuit and provide the corresponding run result in place of the cached run result.

In an aspect, a prompt for user authorization via the authorization component 410 can be accompanied by information relating to the degree of equivalency between the normalized quantum circuit and the cached quantum circuit (e.g., via the guidance component 510, not shown in FIG. 8). For example, if the statistical analysis component 710 determines that the normalized quantum circuit and the cached quantum circuit statistically produce the same results, the statistical analysis component 710 can deem the circuits to be likely matches, and information relating to the likelihood of the two circuits being equivalent can be provided to the user. Based on this information, the user can choose to accept or reject the statistical matching via the authorization component 410.

Figure 9:
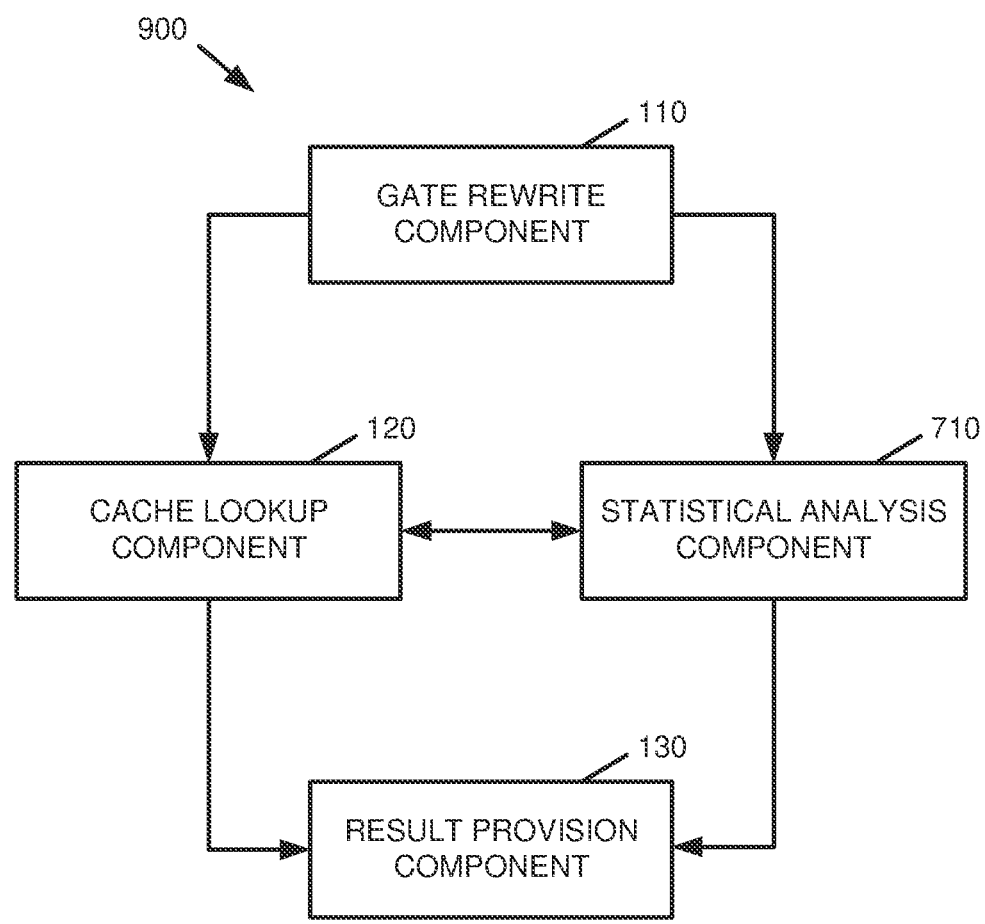
FIG. 9 is a block diagram of a system that facilitates identifying relevant cached run results through cache lookup and statistical analysis according to one or more embodiments described herein.

In an additional aspect as illustrated by system 900 in FIG. 9, selection of cached run results can be based on a combination of structural matching via the cache lookup component 120 and statistical matching via the statistical analysis component 710. By way of non-limiting example, the statistical analysis component 710 can be utilized to search for a statistically equivalent cached quantum circuit in the event that the cache lookup component 120 is unable to find a structural match. As another non-limiting example, the statistical analysis component 710 can be used to identify statistically equivalent sub-circuits of a given quantum circuit, which can then be passed back to the cache lookup component 120 to search for structural matches using the statistically equivalent sub-circuits. Other examples are also possible.

In an aspect, natural language processing based on text descriptions provided with an input quantum circuit can be utilized by system 900 in addition to, or in place of, circuit matching as performed by the cache lookup component 120 and/or statistical analysis component 710. Natural language processing can be used, e.g., to identify circuits of divergent design and/or appearance that have the same or similar functionality. This can, in turn, enable the result provision component 130 to select results based on differing user intent. For instance, a novice user can be provided a cleanest result while expert users can be given a range of results to explore noise and/or perform error mitigation. Other considerations are also possible.

In another aspect, the result provision component 130 and/or other components of system 900 can utilize machine learning and/or other techniques for optimizing cached run results that are presented to a user. For example, system 900 can determine, based on various factors, that a set of circuits (e.g., 20 circuits) are similar. Based on the similar circuits, patterns for code optimization can be learned that favor factors such as circuit size, result fidelity, or the like. These patterns can then be utilized by the result provision component 130 to improve the cached results that are provided to a user.

Figure 10:
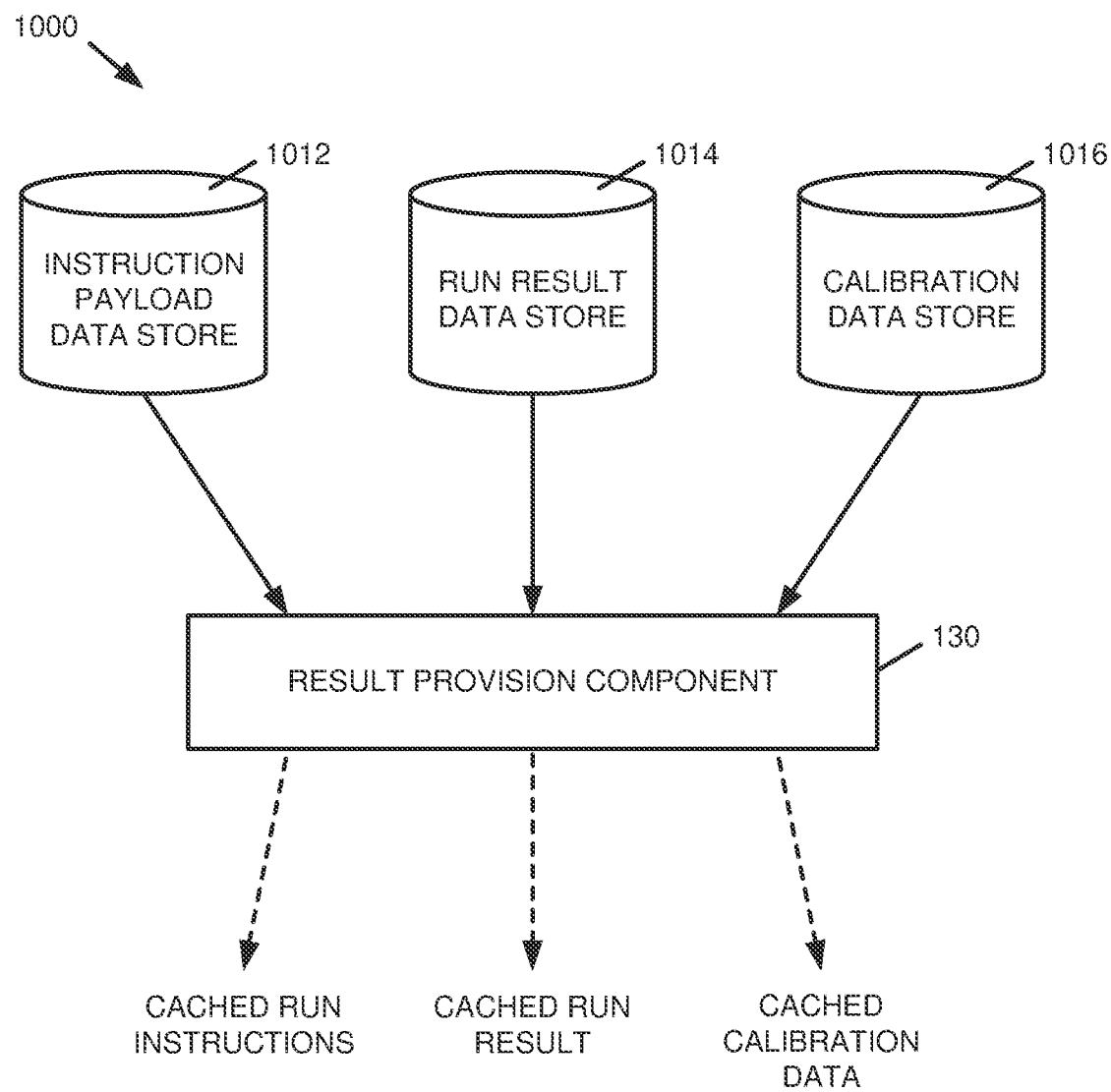
FIG. 10 is a diagram depicting types of information that can be provided in connection with a cached run result according to one or more embodiments described herein.

With reference next to FIG. 10, a diagram 1000 depicting types of information that can be provided in connection with a cached run result according to one or more embodiments described herein is illustrated. Repetitive description of like elements employed in other embodiments described herein is omitted for sake of brevity.

As shown in diagram 1000, the result provision component 130 can return multiple types of information associated with a given quantum experiment. These information types can include, but are not limited to, the following:

1) Instruction payload: The instructions that tell the experiment what to do.

2) Result: The measurements obtained from the experiment.

3) Calibration/parameter data: Information that can aid a user in post-processing and diagnosing sources of error in the experiment.

Other types of information could also be used.

In an aspect, each of the above types of information can potentially be significantly large. For instance, an instruction payload for an experiment can potentially include hundreds of circuits and/or thousands of pulses. Likewise, the result data could include measurements for thousands of runs for each circuit. In addition, some experiments can be associated with additional data such as raw voltages for low-level pulse experiments.

Accordingly, the above types of information can be stored in separate data stores, e.g., an instruction payload data store 1012, a run result data store 1014, and a calibration data store 1016, as respectively depicted by diagram 1000. The result provision component 130 can then be configured to provide respective types of stored data to a user on a limited basis, e.g., as requested by a user, or based on a profile of the user. For instance, if a user is determined to be a novice user, a smaller amount of data can be returned (e.g., the cached run result only without the cached run instructions or calibration data) than if the user is determined to be a more skilled user.

By way of specific, non-limiting example, a user can request the result of an experiment based on a label, e.g., "tomography_1," or on a natural language search, e.g., "an experiment that ran QFT in the past week on device X." If more context to the experiment is desired, the suer could further request the run instructions, which can be provided as a JavaScript Object Notation (JSON) descriptor and/or in other suitable formats. Additionally or alternatively, an advanced user could also request calibration and/or parameter data associated with the experiment.

Figure 11:
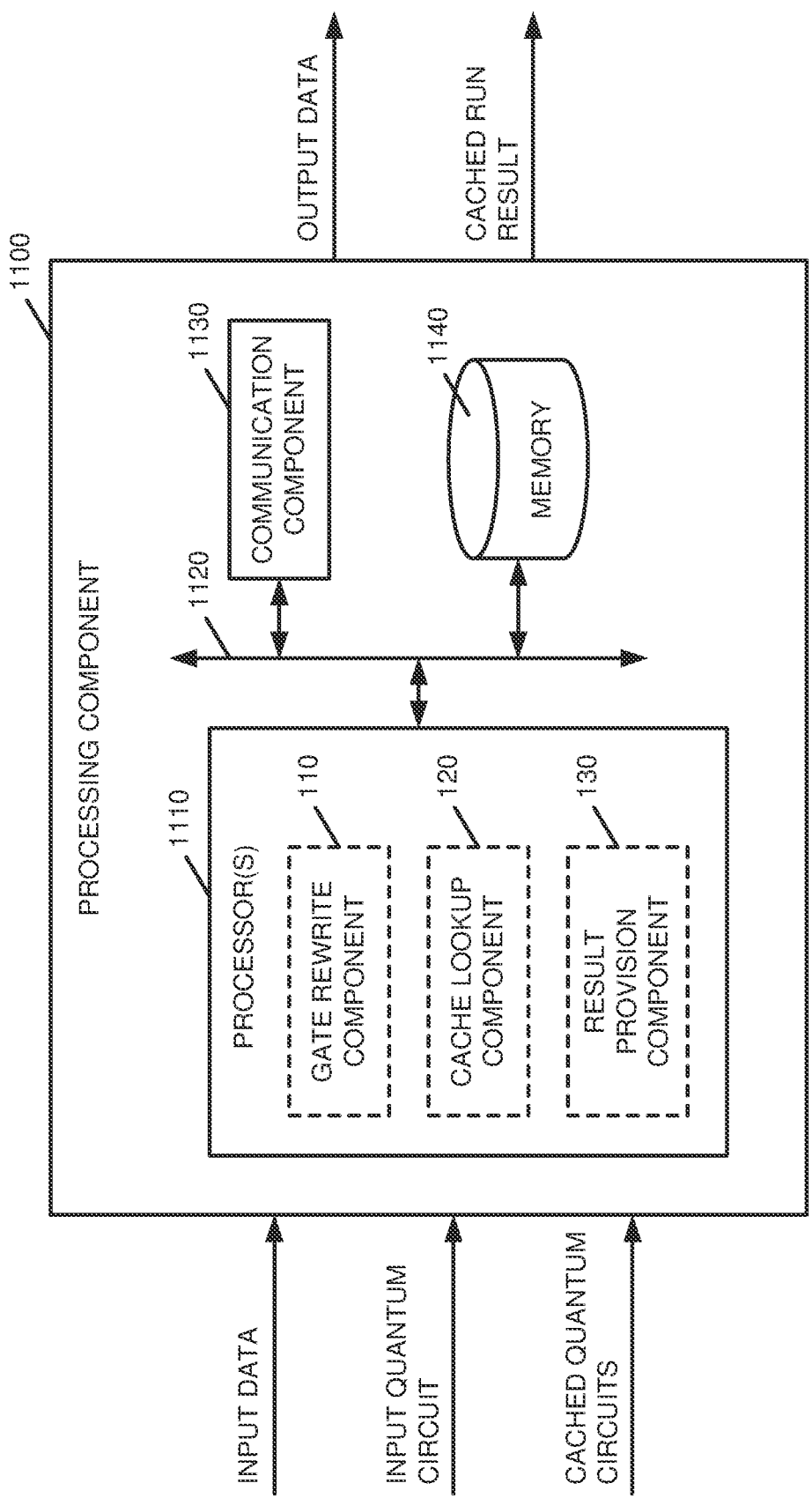
FIGS. 11-12 are diagrams of respective example, non-limiting processing components according to one or more embodiments described herein.

Referring next to FIG. 11, a processing component 1100 that can be utilized to implement one or more aspects described herein is illustrated in accordance with one or more embodiments is illustrated. Repetitive description of like elements employed in other embodiments described herein is omitted for sake of brevity.

As shown in FIG. 11, the processing component 1100 can be associated with at least one processor 1110 (e.g., a central processing unit, a graphical processing unit, etc.), which can be utilized to implement one or more of the gate rewrite component 110, cache lookup component 120, and/or result provision component 130 as described above. The processor(s) 1110 can be connected via a data bus 1120 to one or more additional sub-components of the processing component 1100, such as a communication component 1130 and/or a memory 1140. While the communication component 1130 is illustrated as implemented separately from the processor(s) 1110, the processor(s) 1110 in some embodiments can additionally be used to implement the communication component 1130. In still other embodiments, the communication component 1130 can be external to the processing component 1100 and communicate with the processing component 1100 via a separate communication link.

The memory 1140 can be utilized by the processing component 1100 to store data utilized by the processing component 1100 in accordance with one or more embodiments described herein. Additionally or alternatively, the memory 1140 can have stored thereon machine-readable instructions that, when executed by the processing component 1100, cause the processing component 1100 (and/or one or more processors 1110 thereof) to implement the gate rewrite component 110, cache lookup component 120, and/or result provision component 130 as described above.

Figure 12:
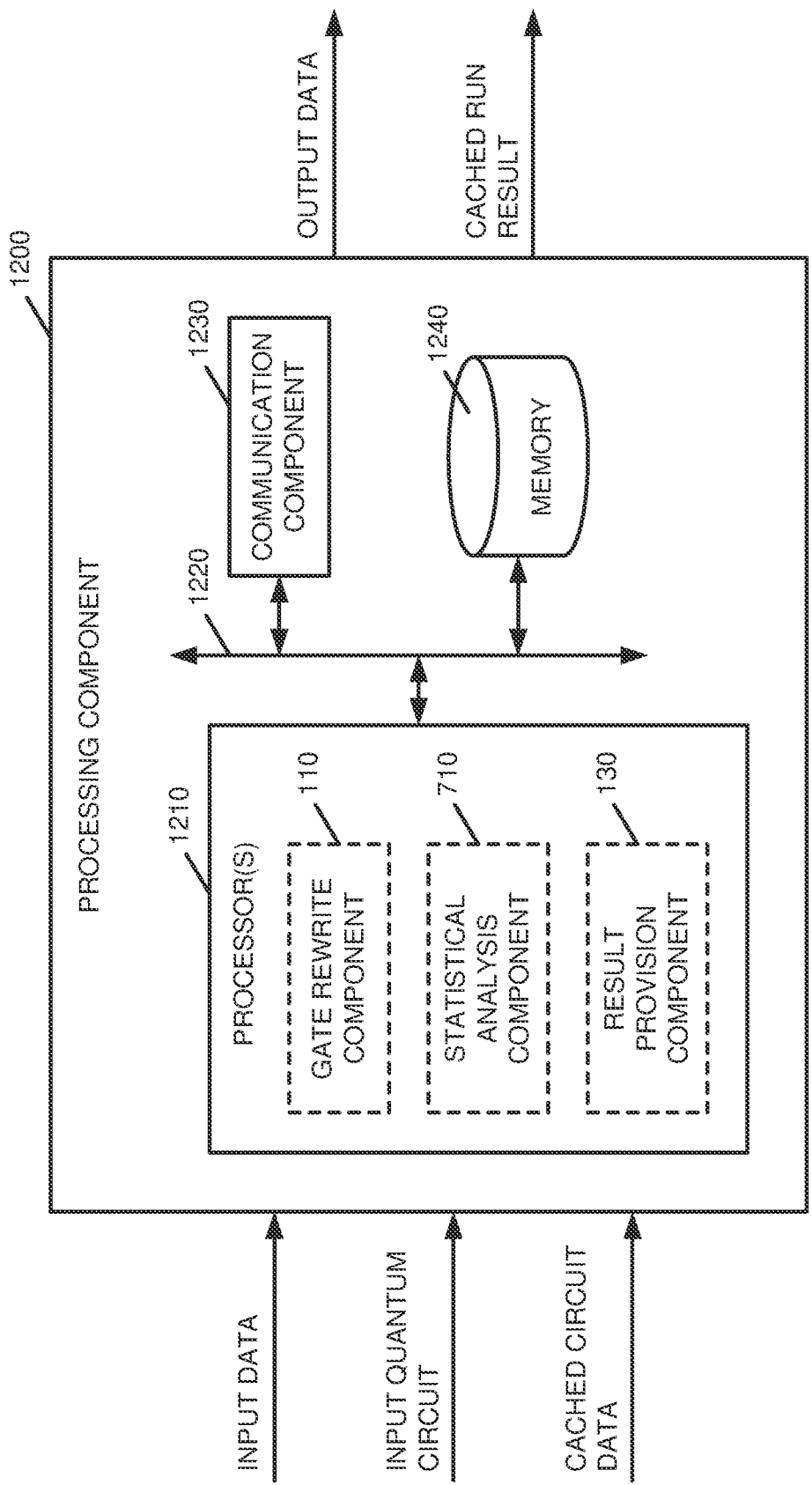

FIG. 12 illustrates another processing component 1200 that can be utilized to implement one or more aspects described herein in accordance with one or more embodiments. Repetitive description of like elements employed in other embodiments described herein is omitted for sake of brevity.

As shown in FIG. 12, the processing component 1200 can be associated with at least one processor 1210, which can be utilized to implement one or more of the gate rewrite component 110, the statistical analysis component 710, and/or the result provision component 130 as described above. The processor(s) 1210 can be connected via a data bus 1220 to one or more additional sub-components of the processing component 1200, such as a communication component 1230 and/or a memory 1240. In an aspect, the communication component 1230 can be configured in a similar manner to the communication component 1130 described above with respect to FIG. 11.

Similar to the memory 1140 described above with respect to FIG. 11, the memory 1240 can be utilized by the processing component 1200 to store data utilized by the processing component 1200 in accordance with one or more embodiments described herein. Additionally or alternatively, the memory 1240 can have stored thereon machine-readable instructions that, when executed by the processing component 1200, cause the processing component (and/or one or more processors 1210 thereof) to implement the gate rewrite component 110, the statistical analysis component 710, and/or the result provision component 130 as described above.

In various embodiments, the processing components 1100, 1200 shown in FIGS. 11-12 can be or include hardware, software (e.g., a set of threads, a set of processes, software in execution, etc.) or a combination of hardware and software that performs a computing task (e.g., a computing task associated with received data). For example, processing components 1100, 1200 can perform simulations of large and/or complex multi-qubit circuits and/or perform other operations that cannot be performed by a human (e.g., are greater than the capability of a human mind). For example, the amount of data processed, the speed of processing of the data and/or the data types processed by processing components 1100, 1200 over a certain period of time can be respectively greater, faster and different than the amount, speed and data type that can be processed by a single human mind over the same period of time. For example, data processed by processing components 1100, 1200 can be raw data (e.g., raw textual data, raw numerical data, etc.) and/or compressed data (e.g., compressed textual data, compressed numerical data, etc.) associated with one or more computing devices. Moreover, processing components 1100, 1200 can be fully operational towards performing one or more other functions (e.g., fully powered on, fully executed, etc.) while also processing the above-referenced data.

Figure 13:
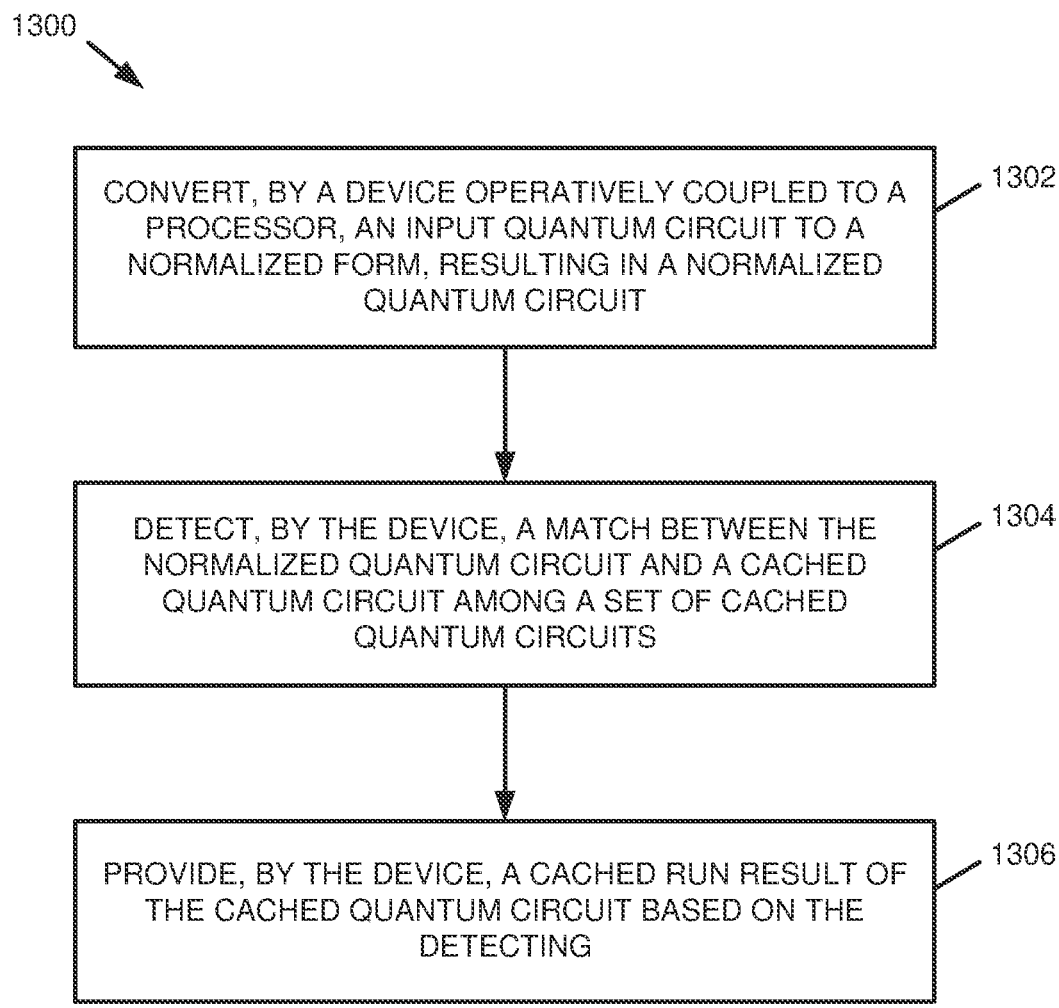
FIGS. 13-14 are flow diagrams of respective example, non-limiting computer-implemented methods that facilitate cached result use through gate rewrite according to one or more embodiments described herein.

FIG. 13 illustrates a flow diagram of an example, non-limiting computer-implemented method 1300 that facilitates cached result use through gate rewrite according to one or more embodiments described herein. Repetitive description of like elements employed in other embodiments described herein is omitted for sake of brevity.

At 1302, a device operatively coupled to a processor (e.g., processor(s) 1110 of a processing component 1100) can convert (e.g., by a gate rewrite component 110) an input quantum circuit to a normalized form, resulting in a normalized quantum circuit.

At 1304, the device can detect (e.g., by a cache lookup component 120) a match between the normalized quantum circuit generated at 1302 and a cached quantum circuit among a set of cached quantum circuits (e.g., cached quantum circuits 122).

At 1306, the device can provide (e.g., by a result provision component 130) a cached run result of the cached quantum circuit based on the detecting performed at 1304.

Figure 14:
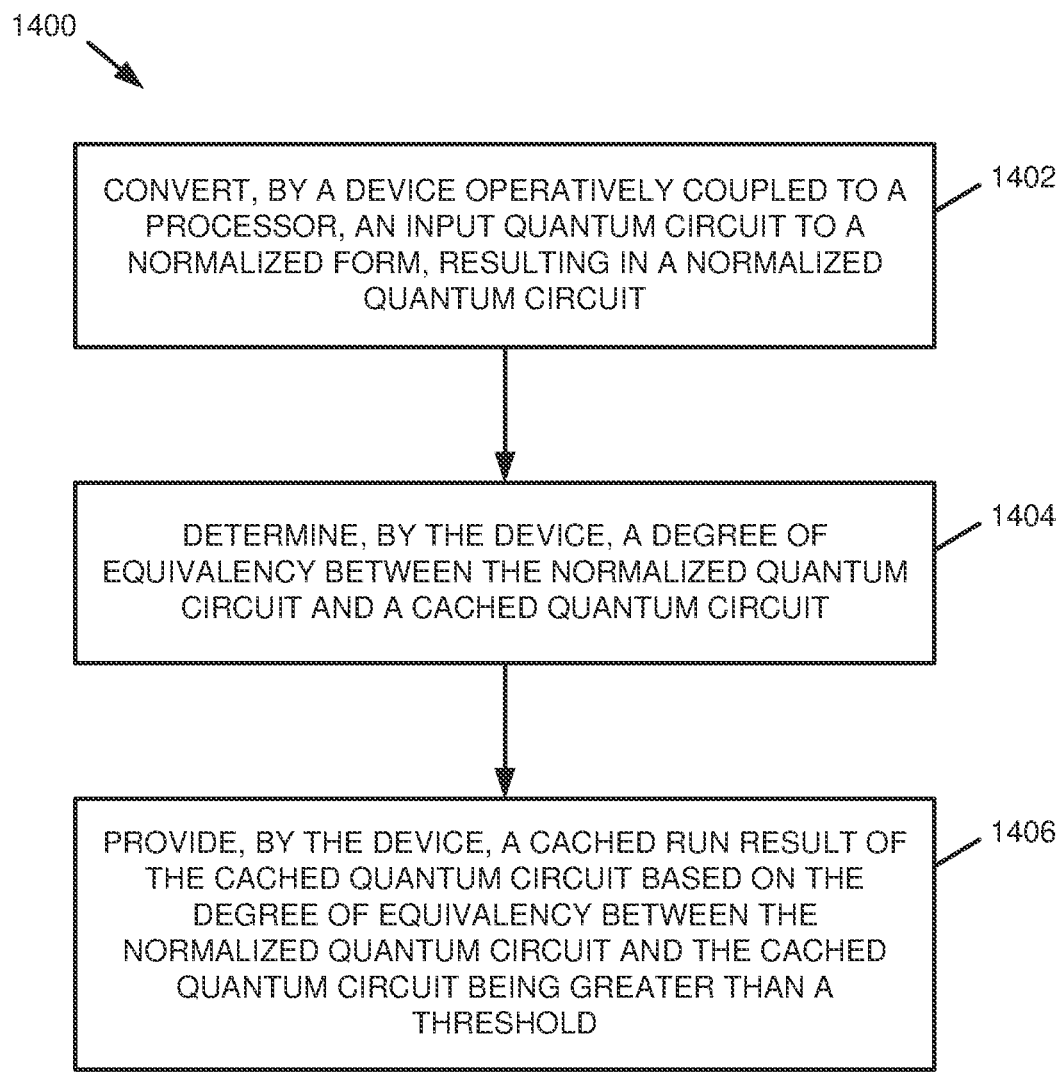

FIG. 14 illustrates a flow diagram of an alternative example, non-limiting computer-implemented method 1400 that facilitates cached result use through gate rewrite according to one or more embodiments described herein. Repetitive description of like elements employed in other embodiments described herein is omitted for sake of brevity.

At 1402, a device operatively coupled to a processor (e.g., processor(s) 1210 of a processing component 1200) can convert (e.g., by a gate rewrite component 110) an input quantum circuit to a normalized form, resulting in a normalized quantum circuit.

At 1404, the device can determine (e.g., by a statistical analysis component 710) a degree of equivalency between the normalized quantum circuit and a cached quantum circuit (e.g., as given by cached circuit data 712).

At 1406, the device can provide (e.g., by a result provision component 130) a cached run result of the cached quantum circuit based on the degree of equivalency between the normalized quantum circuit and the cached quantum circuit as determined at 1402 being greater than a threshold.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies can alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because configuration of data packet(s) and/or communication between processing components is established from a combination of electrical and mechanical components and circuitry, a human is unable to replicate or perform the subject data packet configuration and/or the subject communication between processing components. For example, a human is unable to generate data for transmission over a wired network and/or a wireless network between processing components, etc. Moreover, a human is unable to packetize data that can include a sequence of bits corresponding to information generated during one or more processes as described above, transmit data that can include a sequence of bits corresponding to information generated during one or more processes as described above, etc.

Figure 15:
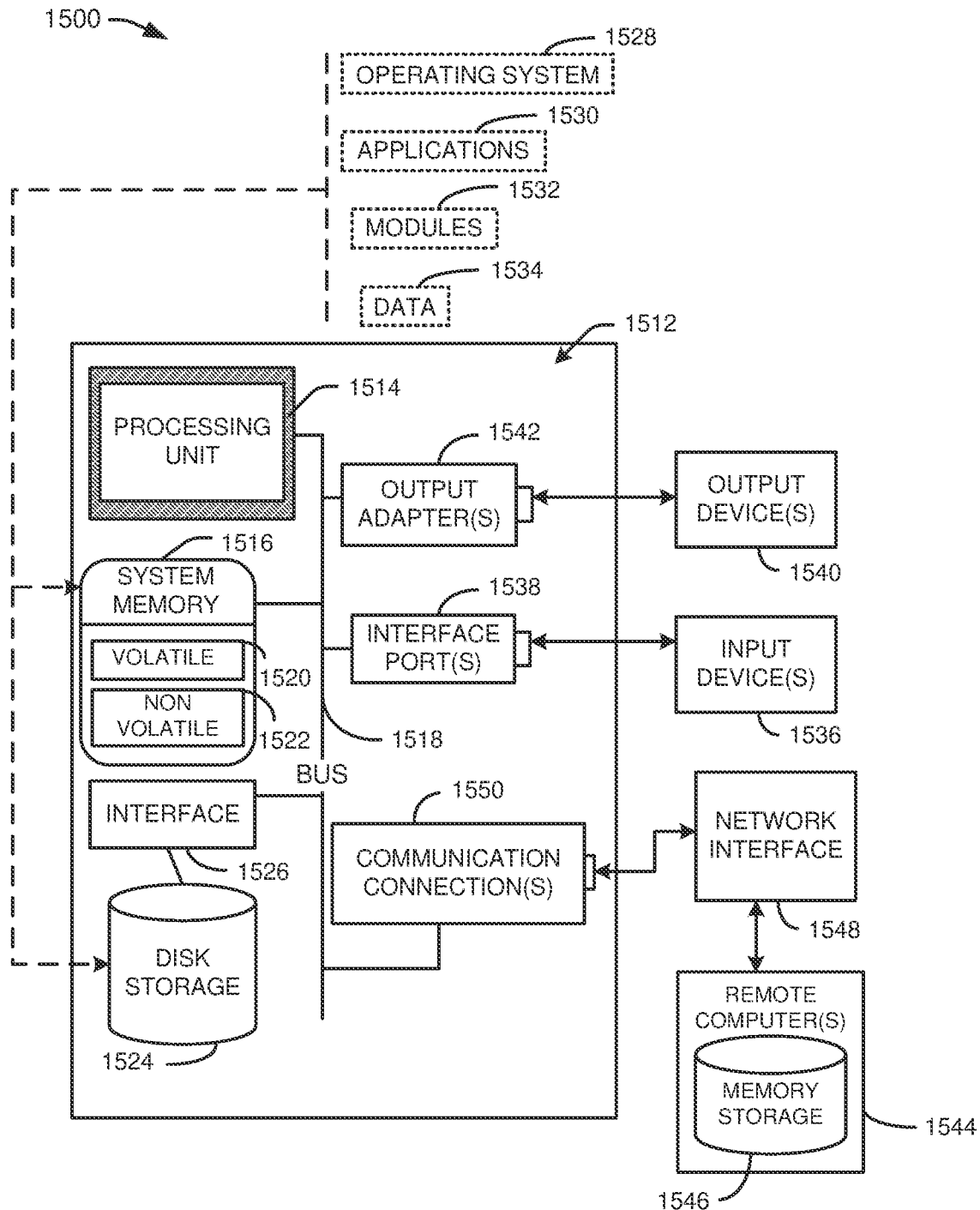
FIG. 15 is a block diagram of an example, non-limiting operating environment in which one or more embodiments described herein can be implemented.

In order to provide a context for the various aspects of the disclosed subject matter, FIG. 15 as well as the following discussion are intended to provide a general description of a suitable environment in which the various aspects of the disclosed subject matter can be implemented. FIG. 15 illustrates a block diagram of an example, non-limiting operating environment in which one or more embodiments described herein can be facilitated. Repetitive description of like elements employed in other embodiments described herein is omitted for sake of brevity. With reference to FIG. 15, a suitable operating environment 1500 for implementing various aspects of this disclosure can also include a computer 1512. The computer 1512 can also include a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514. The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1516 can also include volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1520 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1512 can also include removable/non-removable, volatile/non-volatile computer storage media. FIG. 15 illustrates, for example, a disk storage 1524. Disk storage 1524 can also include, but is not limited to, devices like a magnetic disk drive, solid state drive, floppy disk drive, tape drive, Jaz drive, Zip drive, LS-100 drive, flash memory card, or memory stick. The disk storage 1524 also can include storage media separately or in combination with other storage media including, but not limited to, an optical disk drive such as a compact disk ROM device (CD-ROM), CD recordable drive (CD-R Drive), CD rewritable drive (CD-RW Drive), a digital versatile disk ROM drive (DVD-ROM), or a Blu-ray disc drive. To facilitate connection of the disk storage 1524 to the system bus 1518, a removable or non-removable interface is typically used, such as interface 1526. FIG. 15 also depicts software that acts as an intermediary between users and the basic computer resources described in the suitable operating environment 1500. Such software can also include, for example, an operating system 1528. Operating system 1528, which can be stored on disk storage 1524, acts to control and allocate resources of the computer 1512. System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems. A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port can be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a computer, a server, a router, a network PC, a workstation, a microprocessor based appliance, a peer device or other common network node and the like, and typically can also include many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1550 refers to the hardware/software employed to connect the network interface 1548 to the system bus 1518. While communication connection 1550 is shown for illustrative clarity inside computer 1512, it can also be external to computer 1512. The hardware/software for connection to the network interface 1548 can also include, for exemplary purposes only, internal and external technologies such as, modems including regular telephone grade modems, cable modems and DSL modems, ISDN adapters, and Ethernet cards.

Various embodiments of the present can be a system, a method, an apparatus and/or a computer program product at any possible technical detail level of integration. The computer program product can include a computer readable storage medium (or media) having computer readable program instructions thereon for causing a processor to carry out one or more aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform one or more aspects of the present invention.

One or more aspects of the present invention are described herein with reference to flowchart illustrations and/or block diagrams of methods, apparatus (systems), and computer program products according to one or more embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While portions of the subject matter have been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Various modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
  a memory that stores computer executable components; and
  a processor that executes computer executable components stored in the memory, wherein the computer executable components comprise:
    a cache lookup component that detects a match between a normalized quantum circuit and a cached quantum circuit among a set of cached quantum circuits; and
    a result provision component that provides a cached run result of the cached quantum circuit based on the cache lookup component detecting the match.

2. The system of claim 1, wherein the result provision component applies the cached run result to the normalized quantum circuit in place of running the normalized quantum circuit.

3. The system of claim 1, wherein the computer executable components further comprise:
  an authorization component that generates and transmits a user authorization for application of the cached run result, and obtains the user authorization, and wherein the result provision component applies the cached run result to the normalized quantum circuit based on the authorization component obtaining the user authorization.

4. The system of claim 3, wherein the result provision component runs the normalized quantum circuit, thereby obtaining an independent run result for the normalized quantum circuit, based on the authorization component failing to obtain the user authorization.

5. The system of claim 1, further comprising a gate rewrite component, wherein the computer executable components further comprise:

a guidance component that generates respective explanations for changes made to an input quantum circuit by a gate rewrite component and provides the respective explanations with the cached run result.

6. The system of claim 1, further comprising a gate rewrite component, wherein the gate rewrite component detects a non-normalized gate configuration in an input quantum circuit having a normalized configuration equivalent and replaces the non-normalized gate configuration with the normalized configuration equivalent.

7. The system of claim 1, further comprising a gate rewrite component, wherein the gate rewrite component detects a non-normalized gate configuration in a sub-circuit of an input quantum circuit having a normalized configuration equivalent and replaces the non-normalized gate configuration with the normalized configuration equivalent, resulting in a normalized sub-circuit.

8. The system of claim 7, wherein the sub-circuit is a first sub-circuit, wherein the non-normalized gate configuration is a first non-normalized gate configuration, and wherein the gate rewrite component detects a second non-normalized gate configuration in a second sub-circuit of the input quantum circuit based on replacing the first sub-circuit with the normalized sub-circuit.

9. A computer-implemented method, comprising:
    detecting, by a device operatively coupled to a processor, a match between a normalized quantum circuit and a cached quantum circuit among a set of cached quantum circuits; and
    providing, by the device, a cached run result of the cached quantum circuit based on the detecting.

10. The computer-implemented method of claim 9, wherein the providing comprises applying the cached run result to the normalized quantum circuit in place of running the normalized quantum circuit.

11. The computer-implemented method of claim 9, further comprising:
    requesting, by the device, a user authorization for the cached run result, wherein the providing comprises applying the cached run result to the normalized quantum circuit based on obtaining the user authorization.

12. The computer-implemented method of claim 9, further comprising:
    generating, by the device, respective explanations for changes made to an input quantum circuit by converting the input quantum circuit to a normalized form, resulting in the normalized quantum circuit; and
    providing, by the device, the respective explanations with the cached run result.

13. The computer-implemented method of claim 9, further comprising detecting a non-normalized gate configuration in an input quantum circuit having a normalized configuration equivalent and replacing the non-normalized gate configuration with the normalized configuration equivalent.

14. The computer-implemented method of claim 9, further comprising detecting a non-normalized gate configuration in a sub-circuit of an input quantum circuit having a normalized configuration equivalent and replacing the non-normalized gate configuration with the normalized configuration equivalent.

15. A computer program product for quantum circuit result management, the computer program product comprising a computer readable storage medium having program instructions embodied therewith, the program instructions executable by a processor to cause the processor to:
    detect, by the processor, a match between the normalized quantum circuit and a cached quantum circuit among a set of cached quantum circuits; and
    provide, by the processor, a cached run result of the cached quantum circuit based on the match being detected.

16. The computer program product of claim 15, wherein the program instructions further cause the processor to:
    apply, by the processor, the cached run result to the normalized quantum circuit in place of running the normalized quantum circuit.

17. The computer program product of claim 15, wherein the program instructions further cause the processor to:
    detect, by the processor, a non-normalized gate configuration in input quantum circuit having a normalized configuration equivalent; and
    replace, by the processor, the non-normalized gate configuration with the normalized configuration equivalent.

18. The computer program product of claim 15, wherein the program instructions further cause the processor to:
    generate, by the processor, respective explanations for changes made to an input quantum circuit by the converting.

19. The computer program product of claim 18, wherein the program instructions further cause the processor to:
    provide, by the processor, the respective explanations with the cached run result.

20. The computer program product of claim 15, wherein the program instructions further cause the processor to:
    detect, by the processor, a non-normalized gate configuration in an input quantum circuit having a normalized configuration equivalent and replaces the non-normalized gate configuration with the normalized configuration equivalent.

* * * * *